United States Patent Office 3,705,043
Patented Dec. 5, 1972

3,705,043
INFRARED ABSORPTIVE JET PRINTING INK COMPOSITION
Daniel M. Zabiak, River Grove, Ill., assignor to A. B. Dick Company, Niles, Ill.
No Drawing. Filed Dec. 7, 1970, Ser. No. 95,951
Int. Cl. C09d 11/02
U.S. Cl. 106—20                              4 Claims

ABSTRACT OF THE DISCLOSURE

This invention is addressed to an ink composition suitable for use in jet printing characterized by high infrared absorptivity comprising a high infrared absorbing coloring component and a humectant in the form of an aliphatic polyol, alkyl ether derivatives of aliphatic polyols and mixtures thereof in aqueous medium.

---

This invention relates to printing inks, and more particularly to a new and improved printing ink for use in jet printing.

In Technical Report No. 1722–1 of the Stanford University Electronics Research Laboratory, dated March 1964 and entitled "High Frequency Oscillography With Electrostatically Deflected Ink Jets," description is made of the early work which was done in what is now known to the art as jet printing. The basic imaging technique in jet printing involves the use of one or more ink jet assemblies connected to a pressurized source of ink. Each jet includes a very small orifice, usually having a diameter of the order of about 0.0024 inch which is electromagnetically energized by magneto restrictive or piezoelectric means to emit a continuous stream of uniform droplets of ink at a rate of the order of 33 to 75 kilohertz. The stream of droplets is directed onto the surface of a moving web of, for example, paper, and is controlled to form printed characters in response to video signals derived from an electronic character generator and in response to an electrostatic deflection system.

In the early work relating to jet printing described in the above report, use was made of various types of commercially available fountain pen inks. However, generally available inks are unsuitable for use in jet printing because they frequently contain solid particles of the dye or other insoluble material contained in the ink which frequently clog the very small orifice of the ink jet.

Perhaps more importantly, commercially available inks have a tendency to "tip dry" when left in the ink jet over short periods such as overnight when the jet printer is not in use, with the result that the ink which dries in the orifice deposits solids therein to clog the orifice and prevent the flow of ink therethrough on resumption of operation of the jet printer.

It is known that humectants, such as glycerine, can be added to inks in general in order to minimize undesired drying of the ink. However, the use of this technique is unsuitable for jet printing inks because glycerine has a high viscosity of the order of 900 centipoise, and therefore, cannot be used as the sole humectant in amounts sufficient to prevent undesired tip drying of jet printing inks without increasing the viscosity of the ink to the extent it will not flow through the jet properly. This problem is further compounded by the fact that jet printing inks are generally recirculated in a jet printer whereby the ink is continually subjected to a water loss through evaporation, to thereby further increase the viscosity of the jet printing ink.

In copending application Ser. No. 95,953, filed concurrently herewith description is made of a new and improved ink composition suitable for use in jet printing in which use is made of a humectant system comprising a mixture of a lower alkoxy triglycol and another humectant, such as a polyethylene glycol, a lower alkyl ether of diethylene glycol or glycerine. As described in the aforementioned application, the use of the humectant system as described substantially prevents or minimizes tip drying of the ink composition in the nozzle of a jet printer while not increasing the viscosity above the desired range of 1 to 10 centipoise at 25° C., even where the ink composition is subject to loss of water through evaporation during recirculation of ink in the printer.

While the ink composition described in the aforementioned copending application represents a distinct advance in the art of jet printing inks, it is sometimes desirable to make use of jet printing inks having high infrared absorptive characteristics. In the preparation of multiple copies of thermally imageable duplicating masters, it is necessary that the image printed on the substrate which is imaged by heat, such as Thermofax paper, Azofax paper, Transofax masters, thermal stencils and the like, be capable of absorbing at least 50% infrared radiation in the range of about 700 to 1100 nm., and re-emit radiation in longer wavelengths in the form of heat in order to image the duplicating master.

In addition, for some applications, it is desirable that the printed image be capable of detection by infrared scanning devices. Thus, in bar code interpretations, the printed image is exposed to infrared radiation in the range of 800 nm. to 1100 nm. whereby the image should be such that the reflectance of the image (50% or less), as compared to background reflectance, is capable of detection by such infrared detectors.

It is accordingly an object of the present invention to provide an ink composition for use in jet printing which is capable of producing an image having high infrared absorption characteristics.

It is a more specific object of the invention to provide an ink composition for use in jet printing which is capable of producing an image having infrared reflectance characteristics less than 50% as compared to background, which retains the desired viscosity over extended periods of use, and which prevents or substantially minimizes tip drying of the ink in the nozzle of the jet printer.

The concepts of the present invention reside in a new and improved ink composition suitable for use in jet printing processes comprising an infrared absorbing coloring material and at least one humectant in aqueous media. It has been found that the foregoing compositions provide excellent results when used in jet printing processes to provide an image which is characterized by less than 50% infrared reflectance as compared to background. In addition, the ink composition of the invention maintains its viscosity over extended periods of operation, notwithstanding the loss of water through evaporation. The humectant employed in the practice of the invention, in addition to providing relatively uniform viscosity with use, also serves to prevent or substantially minimize tip drying of the ink in the jet nozzle, and thus aids in preventing clogging of the nozzle as a result of printer shut-down.

As the infrared absorber component, use can be made of high infrared-absorptive, water-soluble dyes, and preferably dyes which are capable of absorbing infrared radiation within the range of 700 to 1100 nm. Preferred dyes include water-soluble nigrosines, modified water-soluble nigrosine dyes (e.g., Calcocid Black SR from American Cyanamid), spirit-soluble nigrosine dyes which are rendered soluble in water, water-dispersed carbon blacks and mixtures thereof. The spirit-soluble nigrosine dyes can be solubilized in water by first dissolving the nigrosine dye in an organic solvent which is miscible with water, and the resulting solution formulated into the composition of the invention. The organic solvent preferred for this purpose is N-methyl-2-pyrrolidone, although use can be made of a variety of others.

Water dispersed carbon blacks can also be used in the practice of this invention, and generally have improved infrared absorption characteristics. For this reason, it is possible and frequently preferred to use a mixture of a dye of the type described or a solubilized nigrosine and a water dispersed carbon black. Such water dispersed carbon blacks are commercially available from the Columbia Carbon Company under the designation, Aquablack.

Jet printing inks, for best results, should have a low specific resistivity, such as within the range of 50 to 5000 ohm-cm. Normally, the infrared absorbing materials employed in the practice of the present invention contain sufficient quantities of ionizable impurities to impart the desired conductivity to the aqueous composition. For example, the high infrared absorbing dyes described above generally contain ionizable inorganic salt, such as a Glauber salt or sodium chloride which has been added during manufacture of the dye to standardize the dye lot. Similarly, nigrosine dyes and water-dispersed carbon blacks likewise contain ionizable organic materials. If use is made of a pure infrared absorbing component containing no ionizable material, the desired conductivity can be achieved by the addition of an ionizable material, such as an ionizable salt. Normally, an ionizable salt content of up to 2% provides the desired conductivity.

The total infrared absorbing component preferably constitutes from 1–8% by weight of the ink composition. However, when use is made of water-dispersed carbon black as all or part of the infrared absorbing component, it is generally desired to maintain the carbon black content of the composition below 1% by weight of the composition since greater quantities tend to increase the ink viscosity and introduce the possibility of nozzle plugging. When using a combination of carbon black and a soluble and/or solubilized dye, it has been found that good results are obtained when the composition contains 0.1 to 0.75% by weight carbon black and 1 to 3% by weight of a soluble and/or solubilized dye. When use is made of a soluble and/or solubilized dye or dyes alone without carbon black, the amount of dye preferably employed is 2 to 5% by weight of the composition.

It is essential to the practice of the invention that the ink composition have a viscosity within the range of 1.0 to 10 centipoise, and preferably 1.0 to 5.0 centipoise, as measured at 25° C., in order to achieve the desired rheological characteristics. As indicated above, the viscosity of the ink composition of the invention is conveniently regulated by the use of a humectant component. In addition to controlling the viscosity, the humectant component also serves to prevent or substantially minimize undesirable drying of the ink composition in the nozzle of the printer and thereby prevent clogging.

As the humectant component, use can be made of aliphatic polyols, and preferably alkylene glycols in which the alkylene group preferably contains 2–6 carbon atoms, as represented by ethylene glycol, propylene glycol, butylene glycol, hexylene glycol including the polyalkylene glycols as represented by diethylene glycol, dipropylene glycol, triethylene glycol, tripropylene glycol, tetraethylene glycol. It is possible to employ commercially available polyalkylene glycols, such as Carbowax 200 or Carbowax 400, which are polyethylene glycols having average molecular weights of about 200 and 400, respectively. In general, it is preferred, when using polyalkylene glycols, to use those materials having an average molecular weight less than 600 since higher molecular weight polyalkylene glycols frequently serve to undesirably increase the viscosity of the ink composition.

Use can also be made of the alkyl ether derivatives of the foregoing polyols as the humectant for use in the ink composition of the invention. Preferred glycol ethers are the alkyl ethers of alkylene glycols in which the alkyl group contains 1–6 carbon atoms (e.g., methyl, ethyl, propyl, butyl, etc.) and the alkylene group contains 2–6 carbon atoms. Representative of the foregoing glycol ethers are ethylene glycol methyl ether, ethylene glycol ethyl ether, ethylene glycol butyl ether, ethylene glycol hexyl ether, diethylene glycol methyl ether, diethylene glycol ethyl ether, diethylene glycol butyl ether, propylene glycol methyl ether, dipropylene glycol methyl ether, tripropylene glycol methyl ether, ethoxy triglycol(triethylene glycol ethyl ether), methoxy triglycol (triethylene glycol methyl ether), etc. Mixtures of the foregoing glycols and glycol ethers can be used and frequently are preferred.

The total amount of the humectant component employed in the composition of the invention can be varied within wide limits as dictated by the viscosity consideration of the composition as discussed above. As will be appreciated by those skilled in the art, the amount of the humectant component employed depends somewhat on the molecular weight of the glycol and/or glycol ether employed. In general, the humectant component of the invention constitutes from 5–30% by weight of the composition.

The ink composition can also be formulated to include an anti-bacterial preservative when extended periods of storage are anticipated to prevent or minimize the growth of bacteria in the composition which might otherwise serve to cause agglomeration of the resin or soluble ink composition. For this purpose, use can be made of up to about 1% of any of a variety of known preservatives, such as Dioxin (2,2-dimethyl-6-acetoxydioxane-1,3).

In order to further improve the composition over periods of storage, the composition can be formulated to include a solubilizing agent in order to insure that the water-soluble dye or dyes remain in solution in the aqueous vehicle. The preferred solubilizing agent or dispersant is N-methyl-2-pyrrolidone, although use can be made of a variety of other well known solubilizing agents.

The amount of the solubilizing agent employed is not critical, and depends somewhat on the amount of water-soluble dye employed as well as, to a lesser degree, the nature of the dye. Generally, the solubilizing agent is used in an amount up to about 10% by weight, and preferably 1–4% by weight, based on the total weight of the composition. When use is made of a spirit-soluble nigrosine solubilized with, for example, methyl pyrrolidone, it is preferred that the methyl pyrrolidone or similar solubilizing agent be present in at least 5% by weight.

In preparing the ink composition of the invention, the components are thoroughly mixed to provide a uniform mixture, and then the composition is filtered to remove any particulate matter in the composition to insure that the nozzle of the printer will remain unobstructed during the printing operation. It is generally preferred that the composition be filtered to remove particulate matter having sizes greater than 10 microns in diameter, but preferably 3 microns.

Having described the basic concepts of the invention, reference is now made to the following examples which are provided by way of illustration, and not of limitation of the practice of the invention in the formulation of ink compositions embodying the concepts of the invention.

EXAMPLE 1

Ink composition

| | Percent |
|---|---|
| Calcocid Black SR (American Cyanamid) | 2.0 |
| Water dispersed carbon black (Aquablack-Columbia Carbon) | [1] 0.5 |
| Polyethylene glycol (av. MW 200) (Carbowax 200) | 15.0 |
| Water | 80.5 |

[1] Dry basis.

The foregoing components are uniformly mixed, and the resulting mixture is then filtered to remove particulate matter having diameters greater than 10 microns.

The resulting composition is found to provide excellent results when used in jet printing equipment.

EXAMPLE 2

Using the procedure described in Example 1, the following composition is prepared.

Ink composition

| | Percent |
|---|---|
| Calcocid Black SR | 2.0 |
| N-methylpyrrolidone | 2.0 |
| Methyl ether of diethylene glycol | 5.0 |
| Ethoxytriglycol | 10.0 |
| Water | 81.0 |

EXAMPLE 3

Using the procedure described in Example 1, the following composition is prepared.

Ink composition

| | Percent |
|---|---|
| Water-soluble nigrosine dye (Acid Black 2) | 2.5 |
| Methyl pyrrolidone | 5.0 |
| Methyl ether of diethylene glycol | 5.0 |
| Ethoxy triglycol | 10.0 |
| Water | 77.5 |

EXAMPLE 4

Using the procedure described in Example 1, the following composition is prepared.

Ink composition

| | Percent |
|---|---|
| Spirit-soluble nigrosine dye (20% in N-methyl-2-pyrrolidone) | 10.0 |
| Polyethylene glycol (av. MW 200) | 15.0 |
| Water | 75.0 |

EXAMPLE 5

Using the procedure described in Example 1, the following composition is prepared.

Ink composition

| | Percent |
|---|---|
| Water dispersed carbon black (Aquablack) | 1 |
| Ethyl ether of diethylene glycol | 5 |
| Water | 94 |

EXAMPLE 6

Using the procedure described in Example 1, the following composition is prepared.

Ink composition

| | Percent |
|---|---|
| Calcocid Black SR | 3.0 |
| Diethylene glycol | 7.0 |
| Dioxin | 0.1 |
| Water | 89.9 |

It will be understood that various changes and modifications can be made in the details of procedure, formulation and use without departing from the spirit of the invention, especially as defined in the following claims.

I claim:

1. An ink composition consisting essentially of a coloring component selected from the group consisting of water-dispersed carbon black, said carbon black being present in an amount within the range of 0.1 to 0.75% by weight, and a dye solubilized in water selected from the group consisting of water soluble nigrosine dyes, and spirit soluble nigrosine dyes, the coloring component being capable of absorbing at least 50% of radiation within the range of 700 to 1100 mm. and being present in a total amount of 1 to 8% by weight, 5–30% by weight of a humectant selected from the group consisting of alkylene glycols, alkyl ethers of alkylene glycols in which the alkylene group contains 2–6 carbon atoms and the alkyl group contains 1–6 carbon atoms, and 94 to 30% by weight water wherein the composition has a viscosity of 1 to 10 cp. at 25° C. and a specific resistivity of 50–5000 ohm-cm.

2. The composition of claim 1 wherein the coloring component possesses a specific resistivity such that the specific resistivity of the composition is 50 to 5000 ohm-cm.

3. A composition as defined in claim 1 wherein the composition includes N-methyl pyrrolidone as a solubilizing agent to maintain the coloring component in solution over long periods of storage.

4. A composition as defined in claim 1 wherein the composition includes a preservative.

References Cited

UNITED STATES PATENTS

| | | | |
|---|---|---|---|
| 2,772,175 | 11/1956 | Beatty et al. | 106—22 X |
| 3,346,322 | 10/1967 | Finkenauer et al. | 8—93 X |
| 3,421,910 | 1/1969 | Gilson et al. | 106—30 X |
| 3,436,234 | 4/1969 | Terry et al. | 106—23 X |
| 2,720,461 | 10/1955 | Voet | 106—30 |
| 2,990,405 | 6/1961 | Pepper et al. | 106—22 X |
| 3,314,994 | 4/1967 | Schubert et al. | 8—82 X |
| 3,412,053 | 11/1968 | Pugliese | 106—311 X |
| 2,771,372 | 11/1956 | Chambers et al. | 106—22 |
| 3,519,443 | 7/1970 | Kaplan et al. | 106—22 |

FOREIGN PATENTS

| | | | |
|---|---|---|---|
| 1,178,356 | 1/1970 | Great Britain | 8—79 |
| 923,162 | 4/1963 | Great Britain | 8—1 UA |

DONALD J. ARNOLD, Primary Examiner

D. A. JACKSON, Assistant Examiner

U.S. Cl. X.R.

106—22, 23, 29, 30, 311